June 28, 1949.  R. M. DILWORTH  2,474,394
HEATING AND VENTILATING SYSTEM
Filed July 19, 1946  2 Sheets-Sheet 1
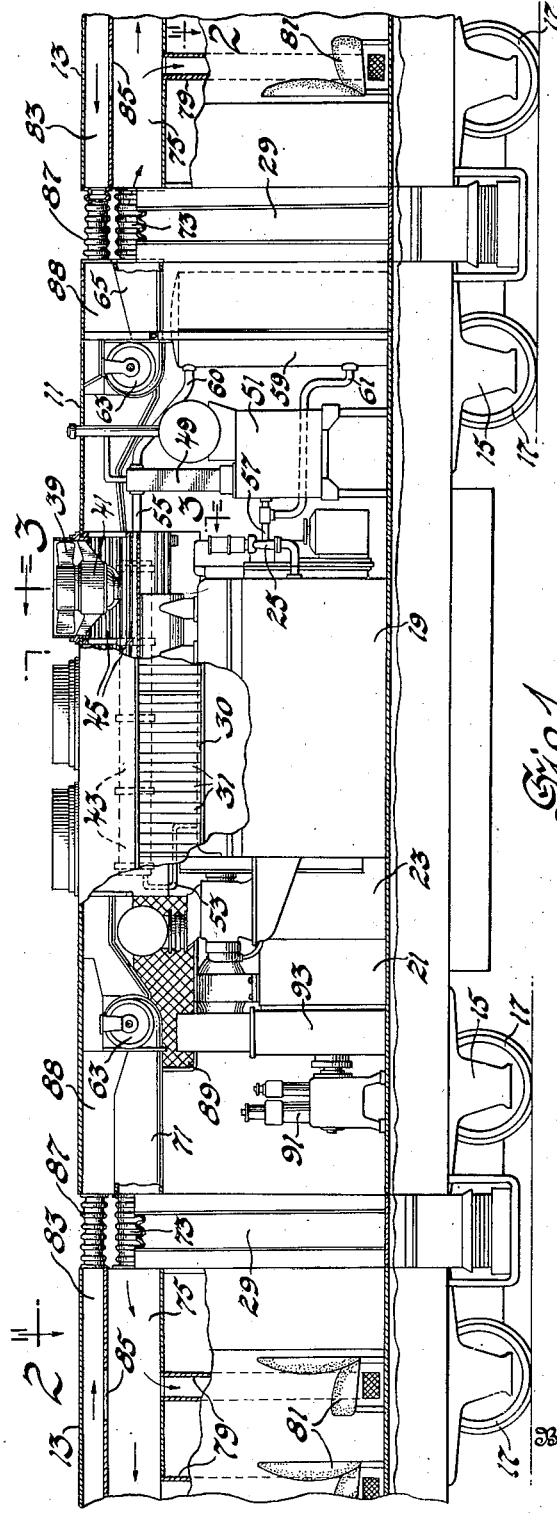
Inventor
Richard M. Dilworth
By Blackmore, Spence, & Hiett
Attorneys June 28, 1949.   R. M. DILWORTH   2,474,394
HEATING AND VENTILATING SYSTEM Filed July 19, 1946   2 Sheets-Sheet 2

Inventor
Richard M. Dilworth
By Blackmor, Spencer & Hint
Attorneys

Patented June 28, 1949

2,474,394

UNITED STATES PATENT OFFICE 2,474,394

HEATING AND VENTILATING SYSTEM

Richard M. Dilworth, Hinsdale, Ill., assignor to General Motors Corporation, Detroit, Mich., a corporation of Delaware Application July 19, 1946, Serial No. 685,001

12 Claims. (Cl. 237—12.6)

The present invention relates to ventilating and heating systems for railway trains.

The object of the invention is to provide means for causing circulation of heated air in controlled amounts through a train of passenger cars coupled to a power car including an internal combustion engine having a cooling system from which the heat is obtained when the cars are propelled by the engine and including means to provide sufficient ventilation and heating while the train is stopped for the unloading and loading of passengers.

The combination of means for accomplishing the above and other objects will become apparent by reference to the following detailed description and drawings illustrating one modification of the invention as applied to a railway train including a Diesel electric power car.

Figure 1 is a vertical elevation view of the power car and the end portions of two passenger cars coupled thereto with parts broken away.

Figure 2 is a transverse horizontal sectional view taken on line 2—2 of Figure 1.

Figure 3:
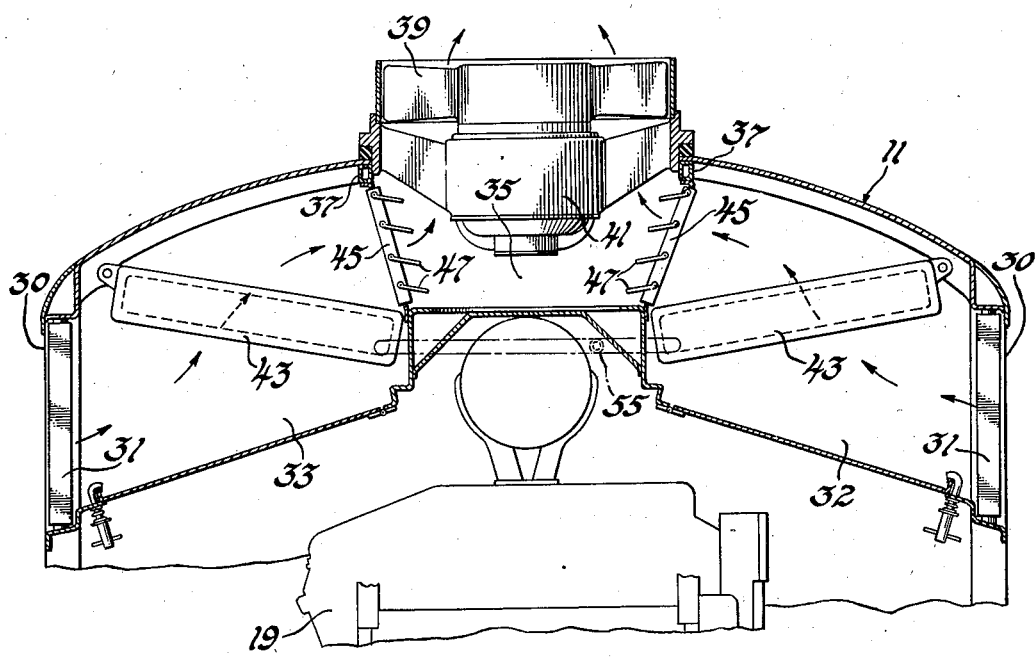
Figure 3 is a vertical cross sectional view taken on line 3—3 of Figure 1 with parts broken away.
Figure 4:
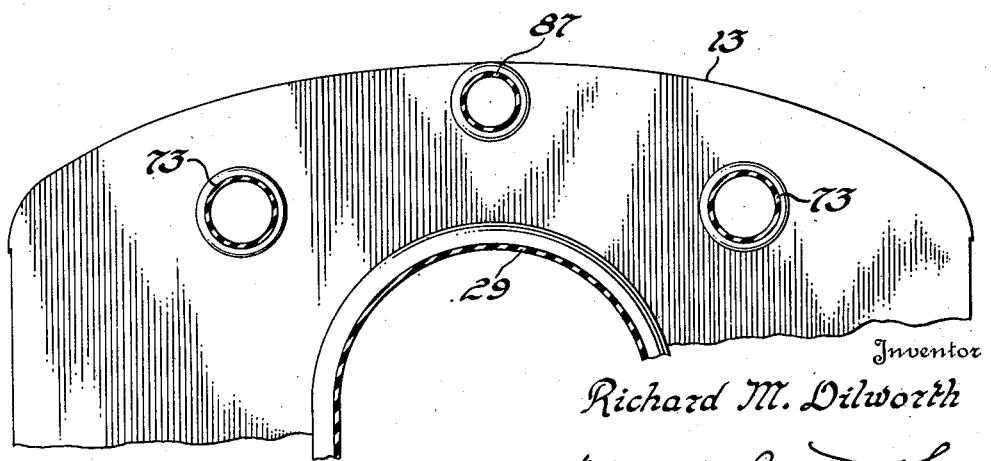
Figure 4 is a partial end elevation view showing the upper end portion of a car with parts broken away.

As best illustrated in Figure 1 the opposite ends of a power car 11 and respective ends of two passenger cars 13 are connected and supported on separate articulated traction trucks 15 having wheels 17 driven in conventional manner by electric traction motors, not shown, on these trucks.

A power plant including a Diesel engine 19 driving an electric traction generator 21, an alternator 23, an engine coolant pump 25 and other auxiliaries is positioned centrally in the power car. A partition 26 extends alongside the power plant and between the end doors of the power car 11 to form a power compartment 27 and a corridor 28 alongside so that passengers may pass through it between the passenger cars, conventional vestibule diaphragms 29 being provided between the ends of the power and passenger cars 11 and 13.

Fresh air inlet openings 30 are provided on opposite sides of the power car 11. Each of these openings 30 are provided with manually operable shutters 31 to control the amount of air passing therethrough and each of these openings is connected by separate air ducts 32—33, shown in Figure 3, extending inwardly and upwardly to a central air discharge duct 35 having a plurality of discharge openings 37 defined by circular fan supporting rings spaced longitudinally along and secured to the central portion of the power car roof.

A plurality of engine cooling fans 39, each driven by a separate induction motor 41, are supported in each of the discharge openings 37 on the fan supporting rings defining these openings to draw air into the inlet openings 30 and discharge it from the discharge openings. Each of the induction motors 41 are arranged to be connected separately and in different combinations with the engine driven alternator 23 to control the amount of air drawn through the ducts 32—33 and each cooling fan 39 is accordingly driven at a speed proportional to that of the engine driven alternator 23. Engine cooling radiators 43 are located across each of the ducts 32—33 and separate pairs of shutters 45 each having vanes 47 normally seated by gravity on each other and on the shutter frame are positioned below and on either side of each fan in the opposite sides of the discharge duct 35 to prevent reverse flow of air therefrom to the inlet ducts 32—33. Operation of any fan 39 causes opening of the shutter vanes adjacent thereto by the suction developed thereby even at low engine speeds.

Engine coolant is circulated through the radiators 49, an engine oil cooler 51 and the engine cooling passages by means of the engine driven coolant pump 25 and connecting pipes 53, 55 and 57, and some coolant is also circulated through a large volume coolant storage tank 59 connected in parallel with the oil cooler 51 by means of the pipes 60—61.

In winter the engine cooling fans 39 are shut down and heated air from the radiators 43 is circulated through the train by motor driven centrifugal heating and ventilating fans 63 each located in separate overhead side heating ducts 65—67—71 extending between the opposite ends of the ducts 32—33 and ends of power car body. The inner or suction ends of the heating ducts 65—67—71 open into the ducts 32—33 between the radiators 43 and gravity operated shutters 45 and the suction created thereby keeps the vanes thereof seated. The outer or discharge ends of the heating ducts 65—67—71 are connected by separate hose connections 73 to separate overhead heating ducts 75—77 along each side of the passenger cars 13. Branch heating ducts 79 extend downwardly from the overhead ducts 75 so that heated air is discharged through the lower open ends of the branch ducts which are positioned under the seats 81 in the passenger cars. Each of the passenger cars is also provided with a central overhead air return duct 83 having openings 85 therein. The return ducts are connected at the ends by flexible hoses 87 between the ends of passenger cars 13 and the power car 11 for returning heated stale air through return ducts 88 to the power compartment 27 of the power car 11. The power compartment 27 is also provided with separate fresh air inlet openings 89 through which intake air is supplied to the engine 19, an air brake compressor 91 and a blower 93 for cooling the traction generator 21 and motors, not shown. The power compartment is maintained at a pressure slightly below atmospheric when the power plant and auxiliaries are operating at normal speed and the heated stale air from the passenger cars 13 accordingly flows back into the lower pressure power compartment 27 to provide adequate circulation of heated air in the passenger cars.

The heating fans 63 may be driven by any well known means at constant or variable speed by power derived from the engine, the coolant storage tank 59 provides means whereby normal temperature of the engine coolant is maintained during periods when the engine is idling so that adequate heating and ventilating of the passenger cars is provided when the train is stopped for unloading and loading passengers.

I claim:

1. In a vehicle an engine, a radiator associated therewith, and an air duct including said radiator, an air inlet opening, an air discharge opening, a hot air outlet connection, a discharge fan, a heating fan and means operable in response to operation of said discharge fan to permit discharge of heated air through the discharge opening from said radiator, said means normally preventing reverse flow through said discharge opening upon operation of said heating fan to force heated air through said hot air outlet connection from said radiator.

2. In a vehicle an engine, a radiator associated therewith and an air duct including said radiator, an air inlet opening including means for varying the amount of air passing therethrough, a discharge opening, a hot air outlet connection, a discharge fan, a heating fan and means operable automatically upon operation of said discharge fan to permit discharge of heated air through said discharge opening from said radiator, said means normally preventing reverse flow of air through said discharge opening upon operation of said heating fan to cause heated air from said radiator to be forced through said hot air connection.

3. In a vehicle an engine having a cooling system comprising an air duct including a cooling air inlet opening, an engine cooling radiator, a heating fan, a hot air outlet connection, a discharge fan, a discharge opening and means operable automatically in response to operation of said discharge fan to permit discharge of radiator cooling air through said discharge opening, said means normally preventing reverse flow of air through said discharge opening whereby operation of said heating fans causes hot air from said radiator to be forced through said hot air outlet connection.

4. In a vehicle an engine having a cooling system comprising a coolant circulating pump, a coolant radiator connected to said pump and engine, an air duct including said radiator, an air inlet opening provided with means for adjusting the air flow therethrough, a discharge opening, a discharge fan for causing discharge of heated air from said radiator through said discharge opening, a heating connection, a heating fan for forcing heated air from said radiator through said heating connection, and means normally preventing reverse flow of air through said discharge opening when said heating fan is operating and said discharge fan is inoperative, said means acting automatically in response to operation of said fan to permit normal flow of air through said radiator from said inlet opening and out of said discharge opening.

5. In a vehicle having a plurality of air inlet openings one of which being provided with a connector, an engine in said vehicle supplied with air through said inlet connections, an engine cooling system comprising an air duct including a separate air inlet opening, an engine cooling radiator, a discharge opening, a radiator cooling fan for causing normal air flow through said radiator between said duct inlet and discharge openings, a hot air outlet provided with a connector, a heating fan for causing air flow through said radiator between said duct inlet and hot air outlet opening, and means normally preventing reverse flow through said discharge opening when said heating fan is inoperative but acting in response to operation thereof to permit normal flow therethrough.

6. In a vehicle having an engine, an engine cooling system, an engine coolant circulating pump, a coolant storage tank and a coolant radiator through which the coolant is circulated, an air duct including said radiator, an air inlet duct, separate air outlet ducts, separate fans for causing flow of air through said radiator between said duct inlet and the respective duct outlets, and means normally preventing reverse flow of air through one of said duct outlet openings when one of said fans is operated to provide a source of heating air from the coolant in said radiator and storage tank, said means adapted to act upon operation of said other fan to discharge the heated air from said other duct outlet for cooling of the engine when heating air is unneccessary.

7. In a vehicle having an engine, an engine cooling system, an engine coolant circulating pump, a coolant storage tank and a coolant radiator through which the coolant is circulated, an air duct including said radiator, an air inlet duct having means for controlling flow of air therethrough, separate air outlet ducts, separate fans for causing flow of air through said radiator between said duct inlet and the respective duct outlets, and means normally preventing reverse flow of air through one of said duct outlet openings when one of said fans is operated to provide a source of heating air from the coolant in said radiator and storage tank, said means adapted to act upon operation of said other fan to discharge the heated air from said other duct outlet for cooling of the engine when heating air is unnecessary.

8. A railway power car having a power compartment including an internal combustion engine having a cooling system including a coolant circulating pump, said power compartment having an inlet air opening for said engine, an air duct having fresh air inlet and outlet openings, a cooling radiator in said duct and connected to said engine and pump and a fan for drawing air through said radiator and discharging the air heated thereby through said duct outlet opening, and flexible means for connecting said duct outlet opening and said compartment air inlet opening for said engine to other cars coupled to said power car for heating and ventilating said cars.

9. In a train of railway cars each having fresh and return air ducts, air connections between said car ducts, one of said cars being a power car and having a power compartment connected to said return air ducts, an internal combustion engine in said compartment using air from said compartment and connected return air ducts and having a coolant circulating pump, a radiator and a coolant storage tank connected to said pump, said radiator being located adjacent a fresh air opening in the fresh air duct of said power car, and means for drawing air through said opening and forcing heated fresh air therefrom into said fresh air ducts in said other cars of said train for return through said return air ducts and power compartment to said engine.

10. In a train of railway cars each having fresh and return air ducts, flexible connections therebetween, one of said cars having a power compartment forming a part of said return air duct, an internal combustion engine in said power compartment from which air is supplied to said engine, said engine having a cooling system including a coolant circulating pump, a cooling radiator connected thereto and located in a portion of the fresh air duct adjacent a fresh air opening therein, and a fan for drawing fresh air through said fresh air opening and forcing heated fresh air into said interconnected fresh air ducts of said train of cars for return through said return air ducts and power compartment to said engine.

11. In a train of railway cars including a power car having a power compartment provided with air inlet openings, an engine and auxiliaries driven thereby supplied with air through said openings whereby said compartment is normally maintained at lower pressure than atmospheric, a cooling system for said engine comprising an air duct including a fresh air inlet opening having adjustable shutters to control the amount of air entering said opening, an engine cooling radiator, a discharge opening including a discharge fan, a hot air outlet opening including a heating fan and gravity operated means for preventing entrance of air through said discharge opening but operable in response to operation of said cooling fan to permit discharge of air therefrom, said cars in said train having heating and return air ducts adapted to be connected to said power car hot air outlet opening and one of said air inlet openings in said engine, respectively, to heat and ventilate said cars.

12. In a train of railway cars including a power car having a through passage and a power compartment provided with air inlet openings, an engine in said compartment receiving air through said openings so that the pressure in said compartment is slightly below atmospheric pressure, a cooling system for said engine comprising a coolant circulating pump, a coolant storage tank, a cooling radiator and an air duct including said radiator, a fresh air inlet opening, an air discharge opening, a discharge fan, a hot air supply opening, a heating fan and means normally preventing inflow of air through said discharge opening when said heating fan is operating and said discharge fan is stopped but operable in response to starting of said discharge fan to cause normal flow of air through said discharge opening, each of said other cars having heating ducts connected to the hot air opening in said power car duct and return air ducts connected to one of said openings in said power compartment for heating and ventilating said cars.

RICHARD M. DILWORTH.

REFERENCES CITED

The following references are of record in the file of this patent:

UNITED STATES PATENTS

| Number | Name | Date |
| --- | --- | --- |
| 2,082,230 | Stout et al. | June 1, 1937 |
| 2,083,768 | Zook | June 15, 1937 |
| 2,116,538 | Mussey et al. | May 10, 1938 |